(12) United States Patent
Smith et al.

(10) Patent No.: US 10,441,028 B2
(45) Date of Patent: Oct. 15, 2019

(54) VARIABLE-DENSITY SOLES FOR ARTICLES OF FOOTWEAR

(71) Applicant: Fuerst Group, Inc., Menlo Park, CA (US)

(72) Inventors: Steven Francis Smith, Lake Oswego, OR (US); Rory Fuerst, Jr., Portland, OR (US); Jeremy Androschuk, Portland, OR (US)

(73) Assignee: Fuerst Group, Inc., Menlo Park, CA (US)

( * ) Notice: Subject to any disclaimer, the term of this patent is extended or adjusted under 35 U.S.C. 154(b) by 0 days.

(21) Appl. No.: 15/628,568

(22) Filed: Jun. 20, 2017

(65) Prior Publication Data

US 2017/0360153 A1   Dec. 21, 2017

Related U.S. Application Data

(60) Provisional application No. 62/352,478, filed on Jun. 20, 2016.

(51) Int. Cl.
| | |
|---|---|
| A43B 13/12 | (2006.01) |
| A43B 13/18 | (2006.01) |
| A43B 13/22 | (2006.01) |
| A43B 13/04 | (2006.01) |
| A43B 7/14 | (2006.01) |
| B29D 35/10 | (2010.01) |

(52) U.S. Cl.
CPC ............ *A43B 13/188* (2013.01); *A43B 7/141* (2013.01); *A43B 7/142* (2013.01); *A43B 7/145* (2013.01); *A43B 7/149* (2013.01); *A43B 7/1465* (2013.01); *A43B 13/04* (2013.01); *A43B 13/12* (2013.01); *A43B 13/125* (2013.01); *A43B 13/226* (2013.01); *B29D 35/10* (2013.01)

(58) Field of Classification Search
CPC ........... A43B 7/141; A43B 7/14; A43B 13/12; A43B 13/125
USPC .............................. 36/25 R, 30 R, 88, 91, 93
See application file for complete search history.

(56) References Cited

U.S. PATENT DOCUMENTS

| | | | | |
|---|---|---|---|---|
| 3,021,572 A | * | 2/1962 | Smith, Jr. | ............... A43B 13/28 264/244 |
| 3,968,577 A | * | 7/1976 | Jackson | ................. A43B 3/128 36/43 |
| 4,245,406 A | * | 1/1981 | Landay | .................... A43B 5/00 264/244 |

(Continued)

*Primary Examiner* — Marie D Bays
(74) *Attorney, Agent, or Firm* — McCoy Russell LLP

(57) ABSTRACT

Variable-density soles for articles of footwear and methods for constructing said soles are provided herein. In one embodiment, a variable-density sole for a footwear article comprises a first layer comprising a first density coupled to a bottom surface of an upper of the article of footwear; and a second layer comprising a second density greater than the density of the first layer, wherein the first layer is physically coupled to the second layer forming an interface between the layers. In this way, comfort of the article of footwear may be increased while decreasing the weight of the article of footwear. Further, forming the variable-density sole includes directly molding the first layer to a strobel board, stitching the strobel board to an upper, and injecting the second layer to the upper with the strobel board and the first layer. In this way, the production of a footwear article is simplified.

15 Claims, 12 Drawing Sheets

(56) References Cited

U.S. PATENT DOCUMENTS

| | | | | |
|---|---|---|---|---|
| 4,399,620 A * | 8/1983 | Funck | A43B 7/28 | 36/28 |
| 4,716,662 A * | 1/1988 | Bar | A43B 7/28 | 12/146 B |
| 4,908,964 A * | 3/1990 | Deem | A43B 3/10 | 36/22 A |
| 5,572,805 A * | 11/1996 | Giese | A43B 13/12 | 36/103 |
| 5,575,089 A * | 11/1996 | Giese | A43B 13/12 | 36/28 |
| 6,708,424 B1 * | 3/2004 | Ellis, III | A43B 5/00 | 36/114 |
| 7,743,532 B2 * | 6/2010 | Bledsoe | A43B 7/28 | 36/110 |
| 8,640,291 B2 * | 2/2014 | Fleming | A43B 9/12 | 12/142 RS |
| 2003/0110662 A1 * | 6/2003 | Gilman | A43B 7/141 | 36/43 |
| 2003/0192202 A1 * | 10/2003 | Schoenborn | A43B 7/142 | 36/30 R |
| 2003/0208931 A1 * | 11/2003 | Chen | A43B 7/14 | 36/92 |
| 2005/0166425 A1 * | 8/2005 | Seiter | A43B 7/1425 | 36/44 |
| 2009/0126229 A1 * | 5/2009 | Fuerst | A43B 1/0027 | 36/88 |
| 2009/0126232 A1 * | 5/2009 | Cholewa | A43B 7/14 | 36/91 |
| 2010/0186264 A1 * | 7/2010 | Cook | A43B 7/24 | 36/30 R |
| 2010/0199526 A1 * | 8/2010 | Chen | A43B 1/0009 | 36/30 R |
| 2011/0000102 A1 * | 1/2011 | Chaw | A43B 7/14 | 36/28 |
| 2011/0288446 A1 * | 11/2011 | Hsieh | A43B 1/0081 | 600/592 |
| 2012/0317845 A1 * | 12/2012 | Vattes | A43B 7/141 | 36/30 R |
| 2015/0282561 A1 * | 10/2015 | Swager Van Dok | A43B 3/0057 | 36/31 |
| 2015/0289591 A1 * | 10/2015 | Jones | A43B 3/0047 | 36/88 |

* cited by examiner

VARIABLE-DENSITY SOLES FOR ARTICLES OF FOOTWEAR

CROSS REFERENCE TO RELATED APPLICATIONS

The present application claims priority to U.S. Provisional Application No. 62/352,478, entitled "VARIABLE-DENSITY SOLES FOR ARTICLES OF FOOTWEAR," and filed on Jun. 20, 2016, the entire contents of which are hereby incorporated by reference for all purposes.

FIELD

The present disclosure relates generally to a variable-density sole for an article of footwear.

BACKGROUND/SUMMARY

Typically, articles of footwear such as shoes, in particular athletic shoes, may require a certain amount of cushioning to absorb the shock of footstep impact when walking, running or performing other similar activities. In activities such as running or walking, the initial impact of a shoe sole is typically along the outer, lateral edge of the heel of a foot. As the cushioning of the shoe sole heel compresses under the force of the footstep impact, the force of impact may be concentrated on the lateral edge of the heel of a foot and may not be distributed along the sole of the shoe.

In order to provide some amount of cushioning to the wearer of the shoes, midsoles and outsoles are common exterior features of footwear. Generally the midsole of a shoe may comprise a single material or materials of similar densities that are affixed to the bottom surface of a shoe upper. Such midsole configurations may typically be manufactured using traditional polyurethane injection (PU injection) processes.

In regards to polyurethane compounds suitable for injection molding processes, the materials must exhibit certain levels of abrasion resistance, tensile strength, and other such physical properties in order to be fit for use as a shoe midsole. In an effort to improve said physical properties of a midsole, materials having a higher density may be used which may result in an increase in weight.

From a manufacturing standpoint, when using traditional PU injection methods, the addition or inclusion of materials having different densities may result in an increase in cost. The increase in costs may be resultant from an increased number of molds and may further result in an increase in production time. For example, when manufacturing items from injected polyurethane components, such items may require a curing step and each different or distinct material may comprise a different curing method, process, or length of time.

Provided herein, is a method for producing a sole for an article of footwear that allows for two or more densities to be achieved while maintaining the current cost and time of manufacturing relative to other soles. In this way, the overall density of a sole may be reduced which may result in a reduction of overall weight of the article of footwear.

The method briefly described above may allow for a sole to comprise lightweight, low density polyurethane compounds that in other methods may not have been used due to weak physical properties. Specifically, by injecting other higher density polyurethane compounds around the low density polyurethane, a softer or more comfortable underfoot feel may be achieved, while still providing protection and structure needed for durability of the shoe.

In one embodiment of the method, the first layer also referred to herein as the inner compound, may be molded directly onto a strobel board of a shoe or another exterior bottom surface of a shoe upper. In this way, the cushion provided by the low-density inner compound may not be limited by adhesive layers or layers of other bonding agents. The direct molding of the first layer onto the strobel board of a shoe may improve overall cushioning and flexibility of the shoe.

Further, the first layer may be directly molded to the strobel board alone, and the strobel board with the first layer molded thereto may then be stitched to an upper. The upper with the strobel board and first layer may then be placed on an injection machine, wherein a second layer comprising a second material may be injection molded to and around the first layer as well as the strobel board and/or upper. In this way, the process of using injection methods to create a footwear article with a dual-density sole may be simplified, thereby reducing the amount of time to create a footwear article as well as reducing the usage of excess material during the production of the footwear article.

BRIEF DESCRIPTION OF THE FIGURES

FIGS. 2-3 and 5-12 are drawn approximately to scale. However, other relative dimensions may be used if desired

DETAILED DESCRIPTION

Figure 1:
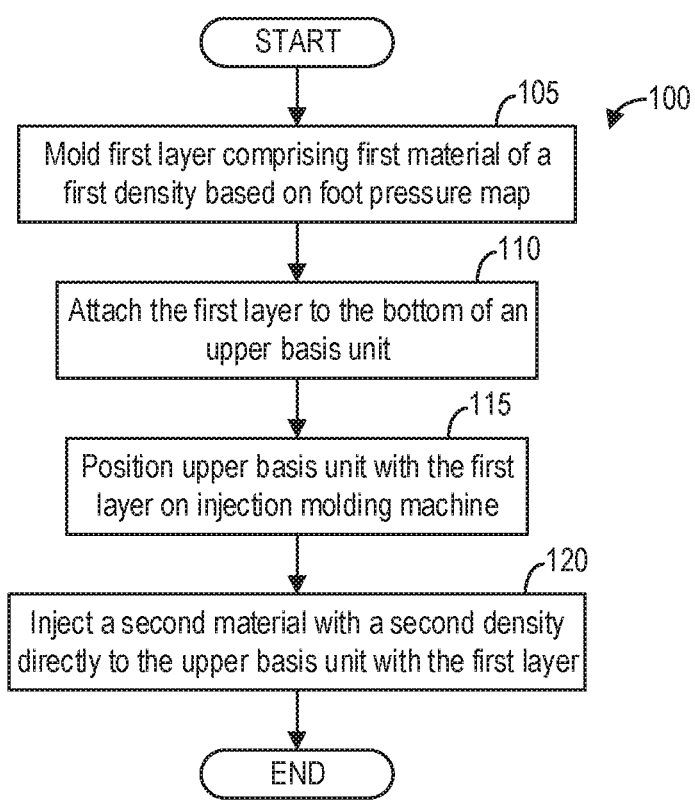
FIG. 1 shows a high-level flow chart illustrating an example method for creating a variable-density sole for a footwear article according to at least one example of the disclosure.
Figure 2:
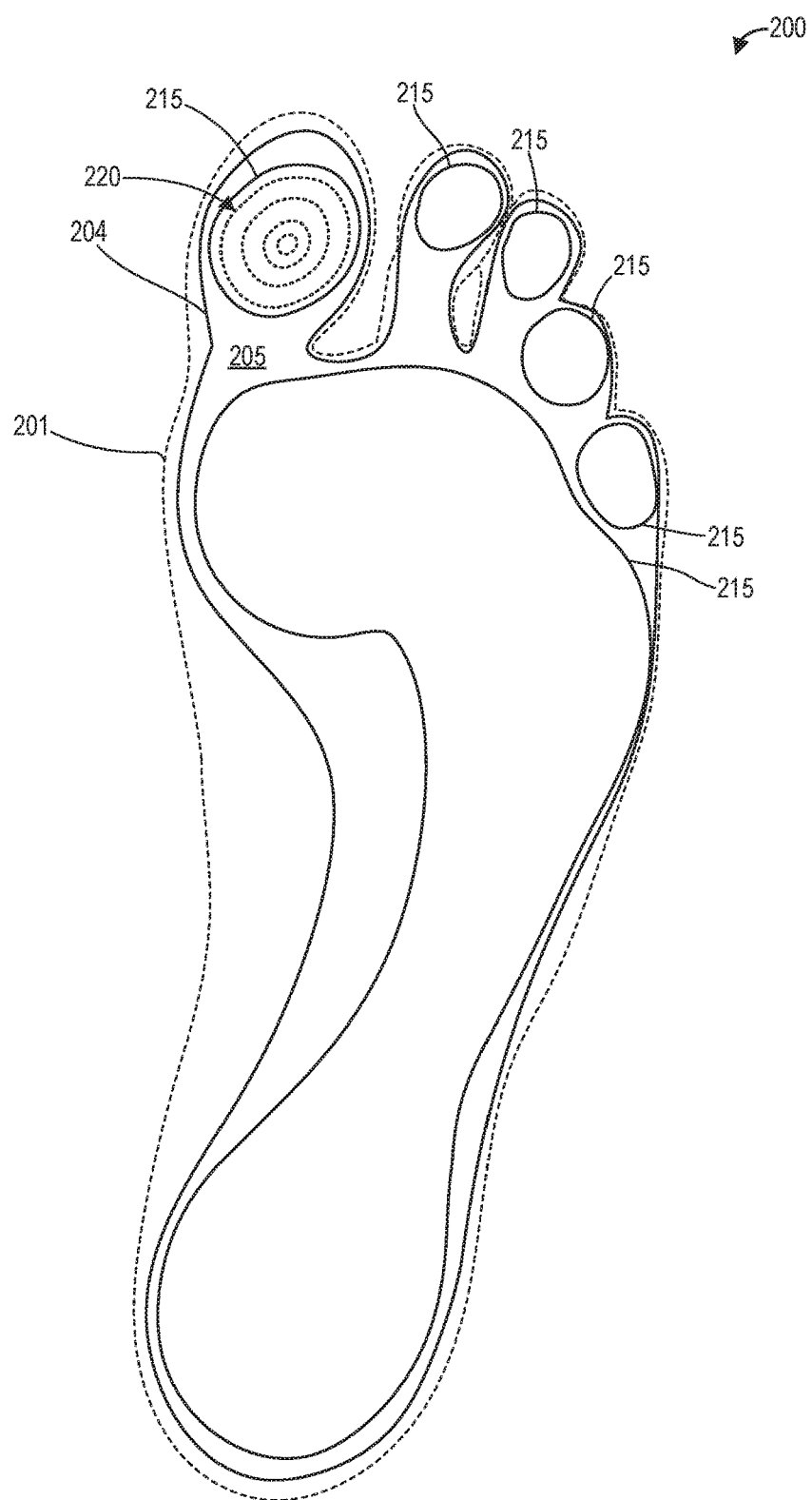
FIG. 2 illustrates an example foot pressure map according to at least one example of the disclosure.
Figure 3:
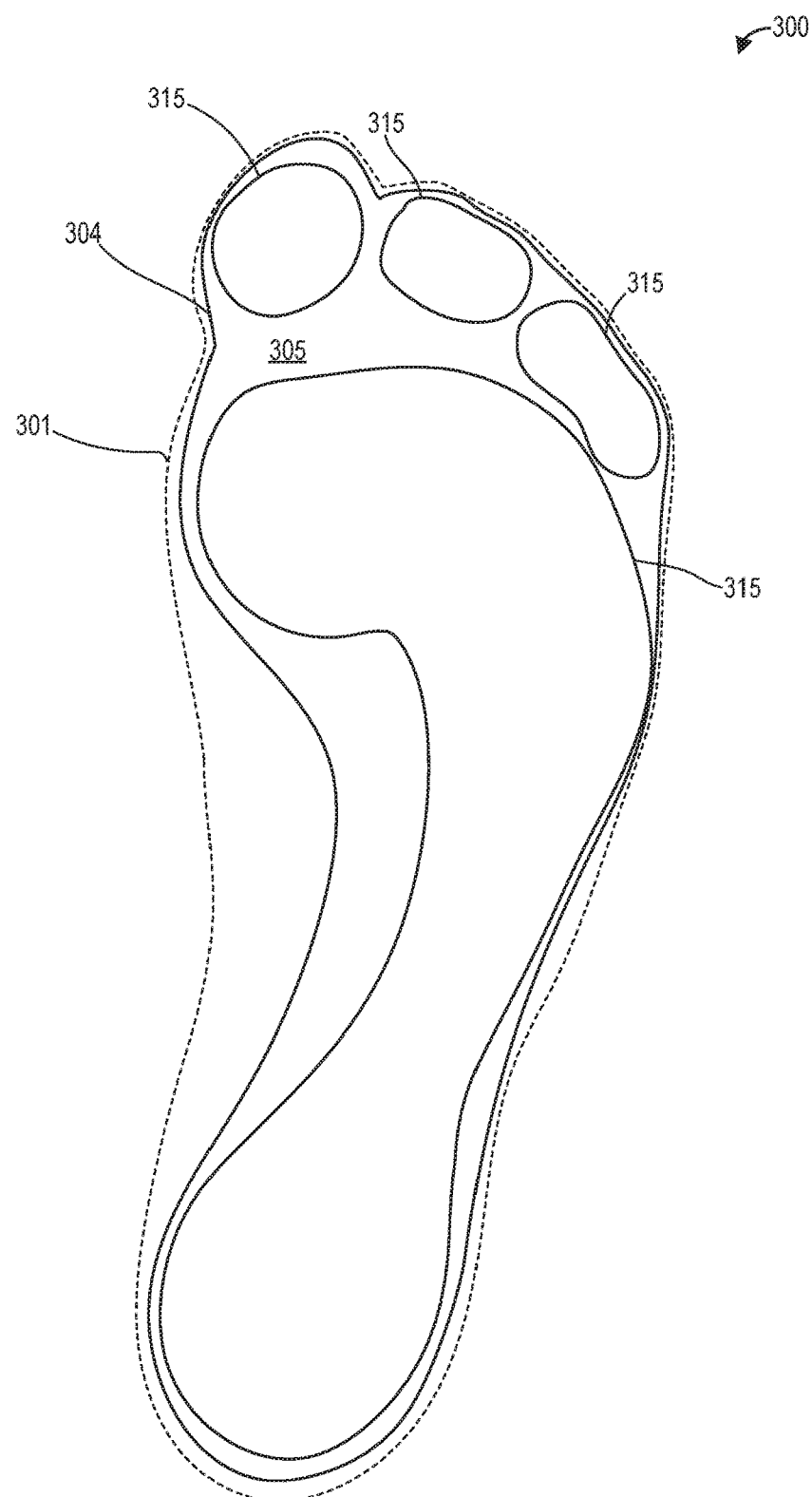
FIG. 3 illustrates another example foot pressure map according to at least one example of the disclosure.
Figure 4:
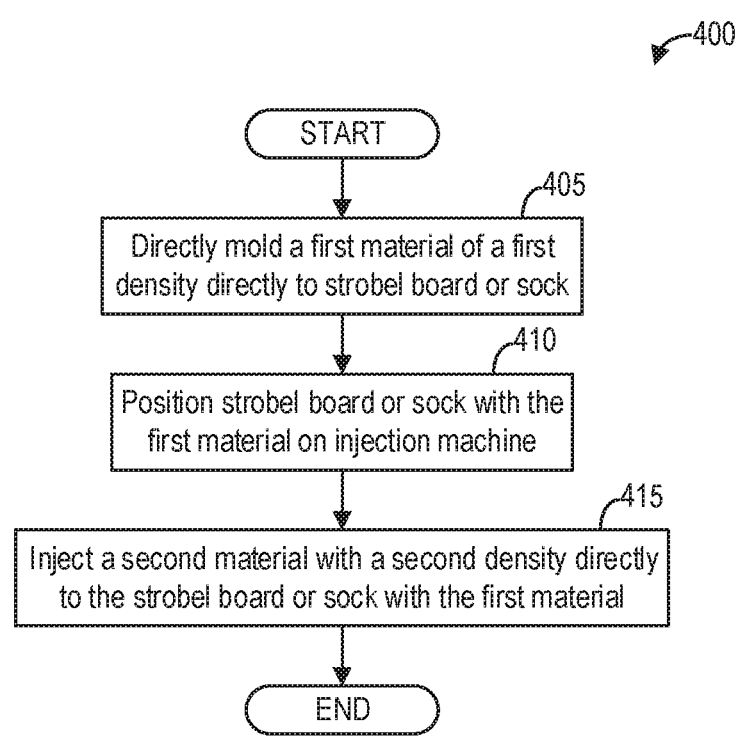
FIG. 4 shows a high-level flow chart illustrating an example method for creating a dual-density sole for a footwear article according to at least one example of the disclosure.
Figure 5:
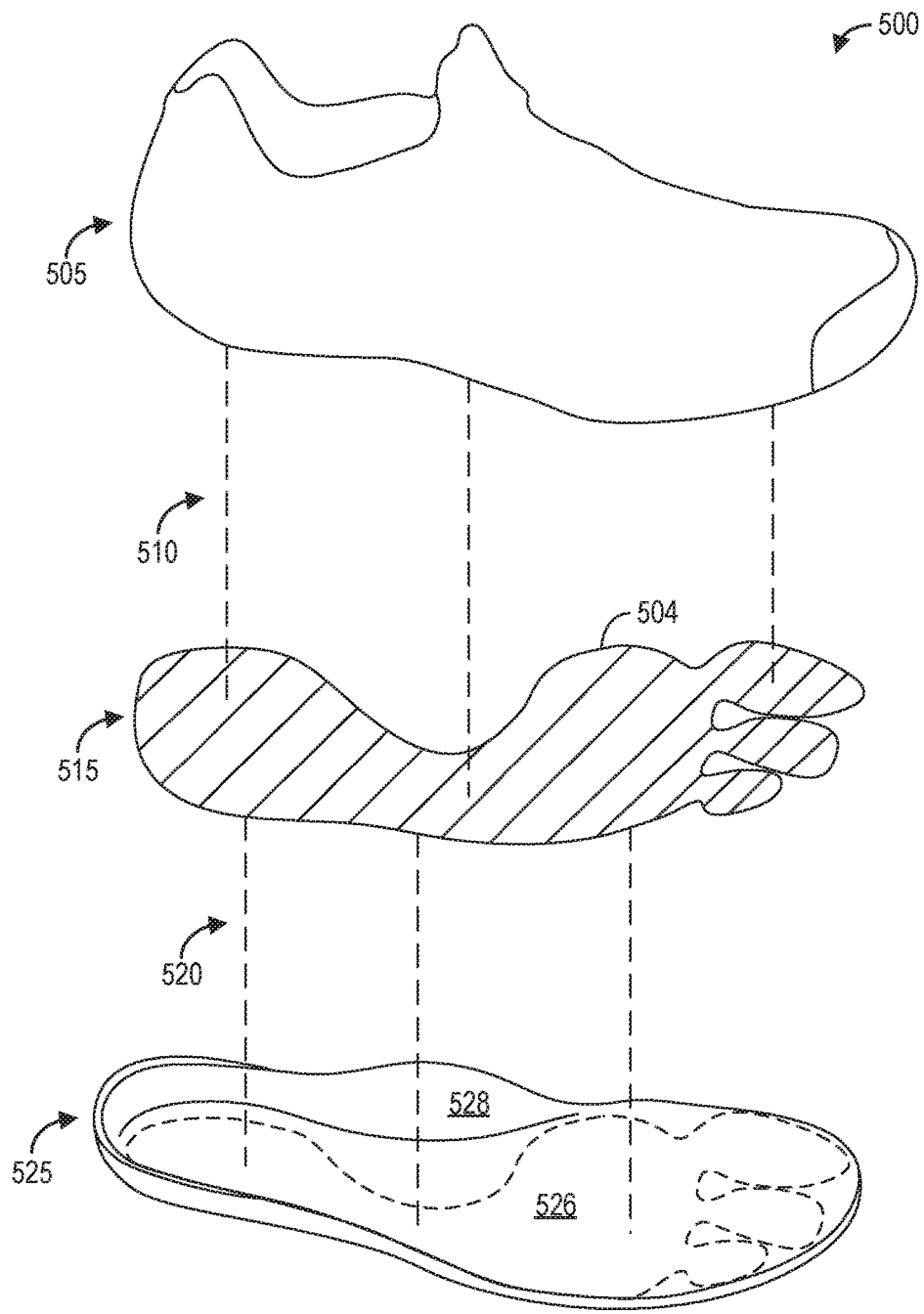
FIG. 5 illustrates an example method for providing a dual-density sole to an upper according to at least one example of the disclosure.
Figure 6:
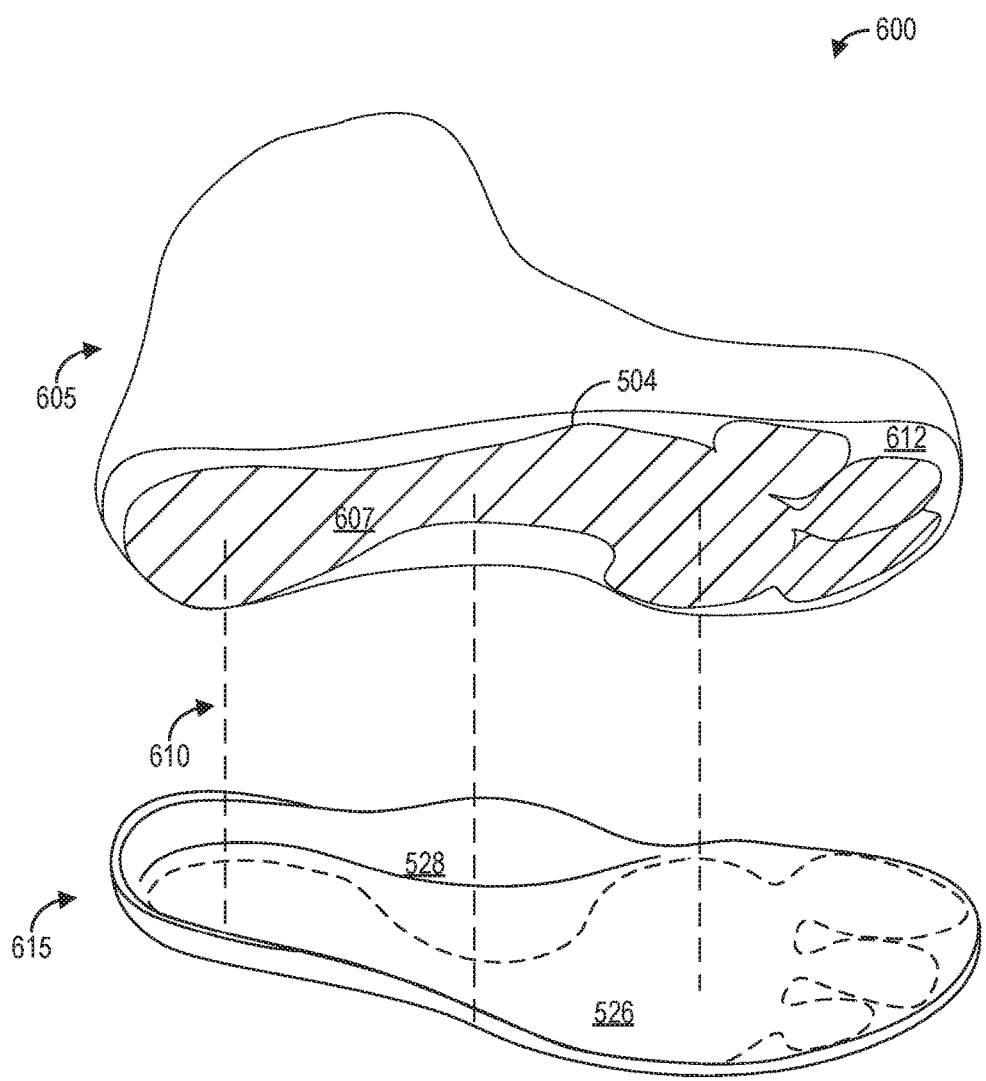
FIG. 6 illustrates an example method for providing a dual-density sole to an upper according to at least one example of the disclosure.
Figure 7:
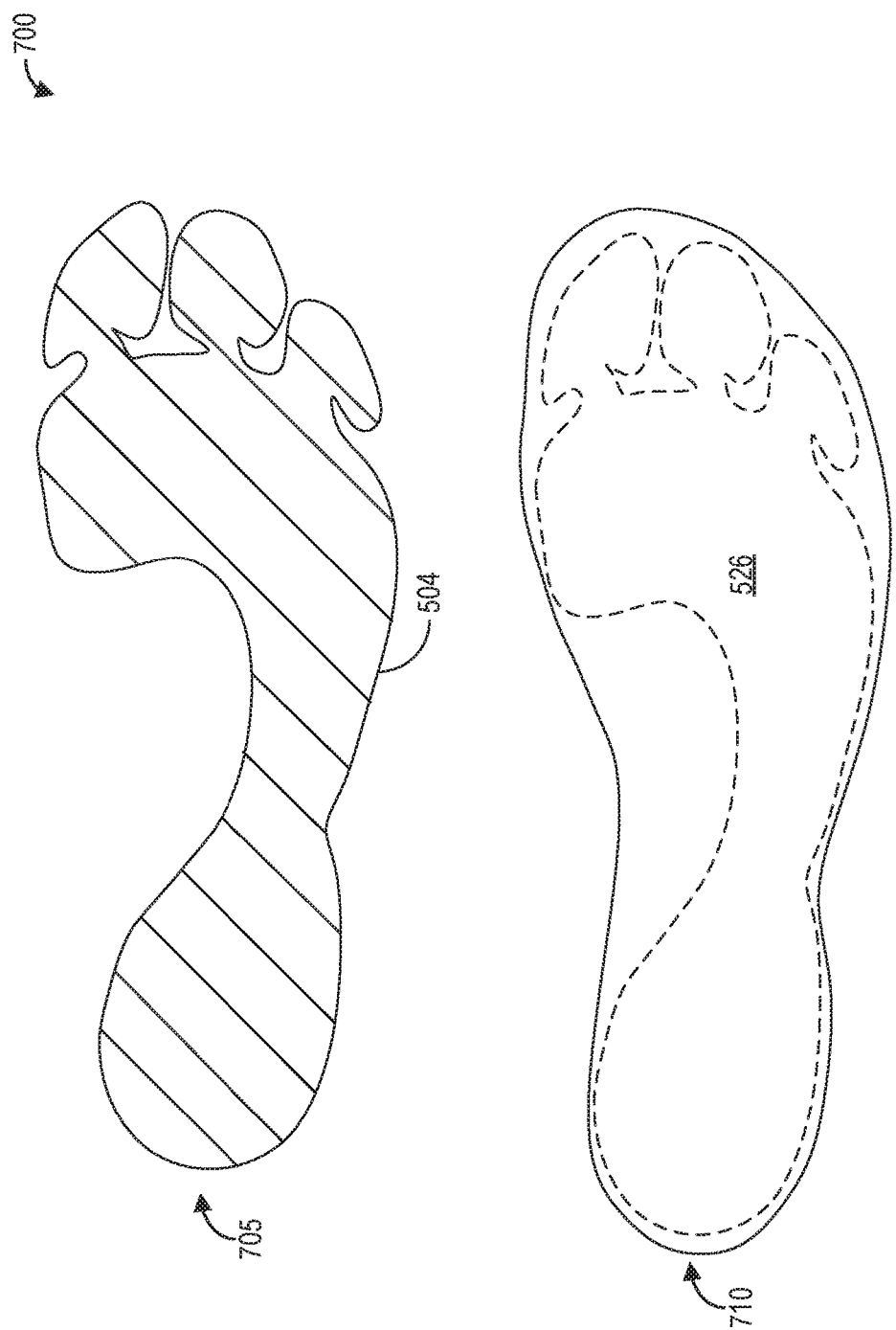
FIG. 7 shows an exploded view of a dual-density sole according to at least one example of the disclosure.
Figure 8:
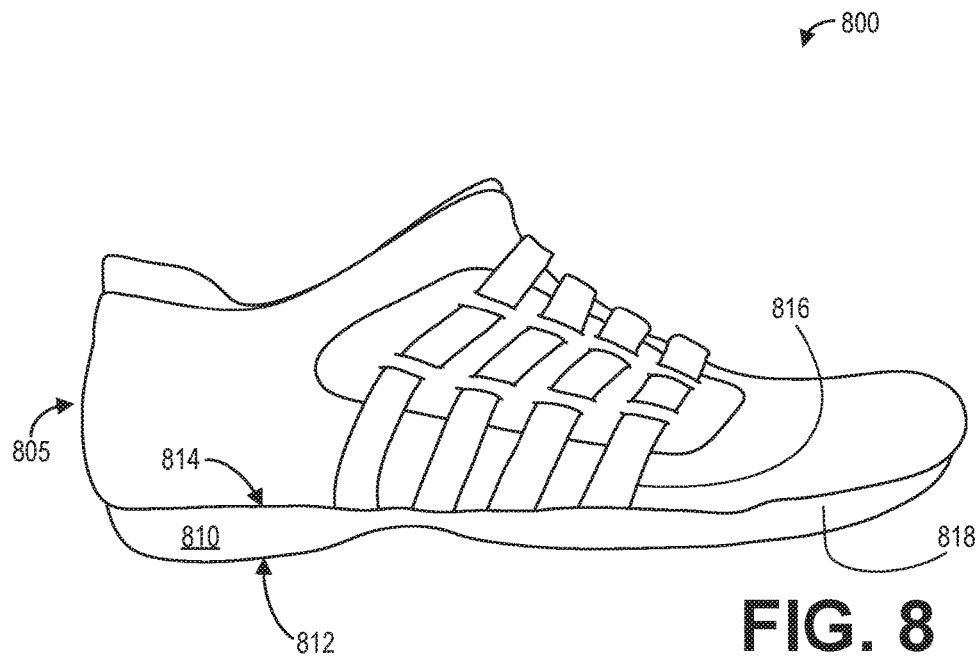
FIG. 8 illustrates a side view of a first sole layer attached to an upper according to at least one example of the disclosure.
Figure 9:
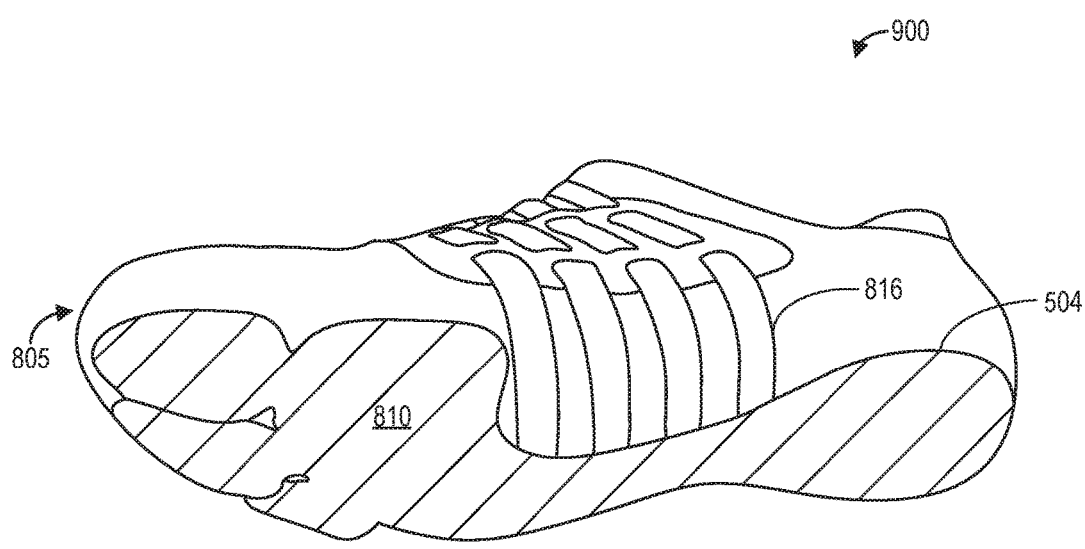
FIG. 9 shows a bottom side perspective view of a first sole layer attached to an upper according to at least one example of the disclosure.
Figure 10A:
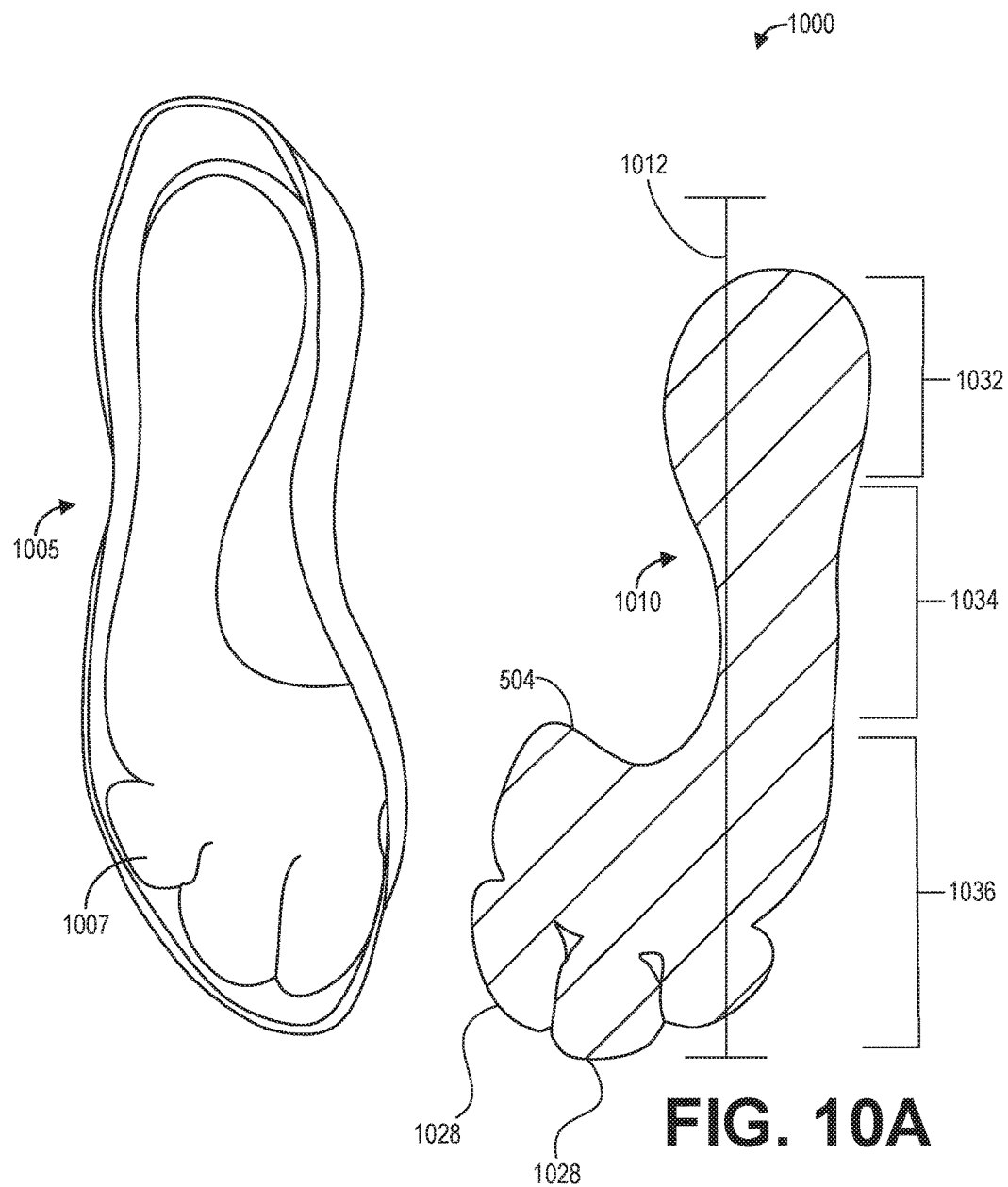
FIG. 10A shows a top view of a first sole layer of a first density and a second sole layer of a second density according to at least one example of the disclosure.
Figure 10B:
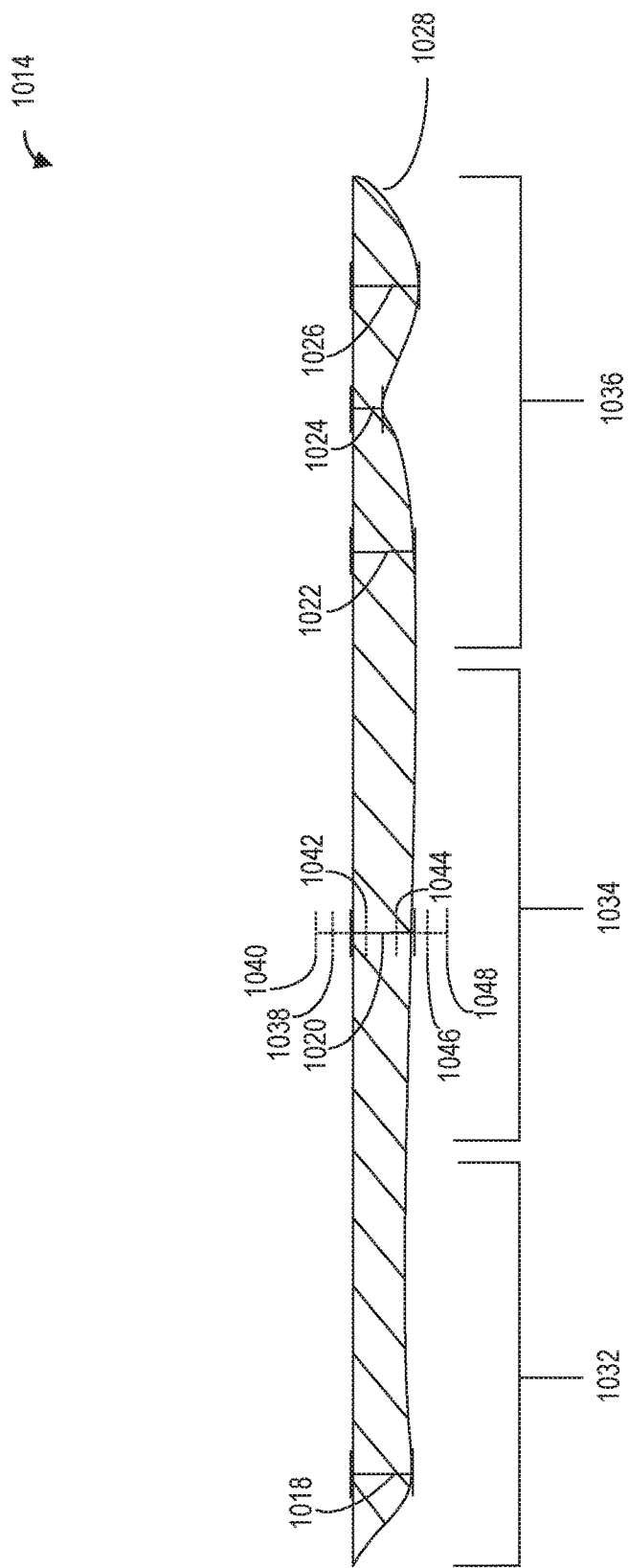
FIG. 10B shows a cross-sectional side view of an example first sole layer.
Figure 11:
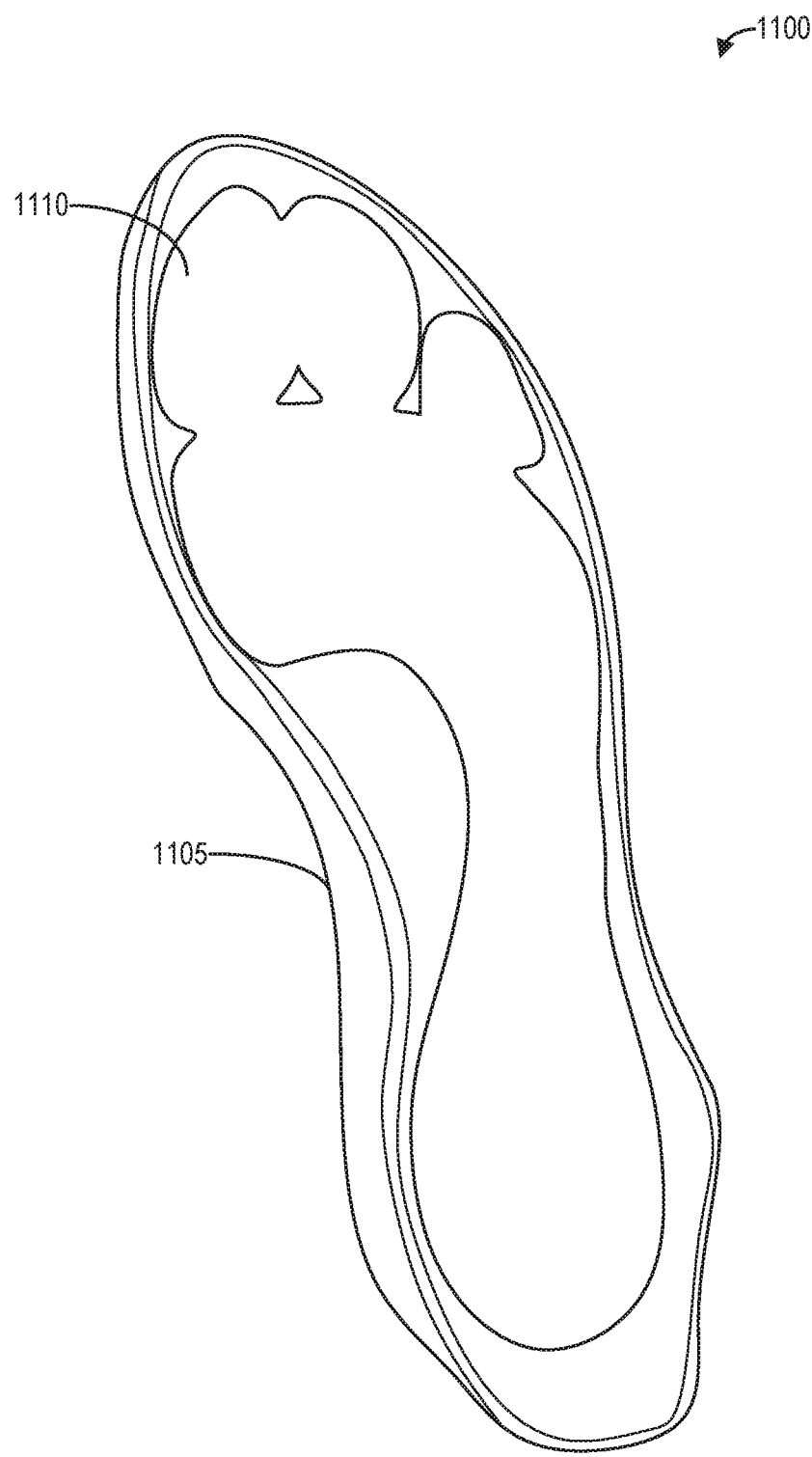
FIG. 11 shows a top view of a first sole layer attached to a second sole layer according to at least one example of the disclosure.
Figure 12:
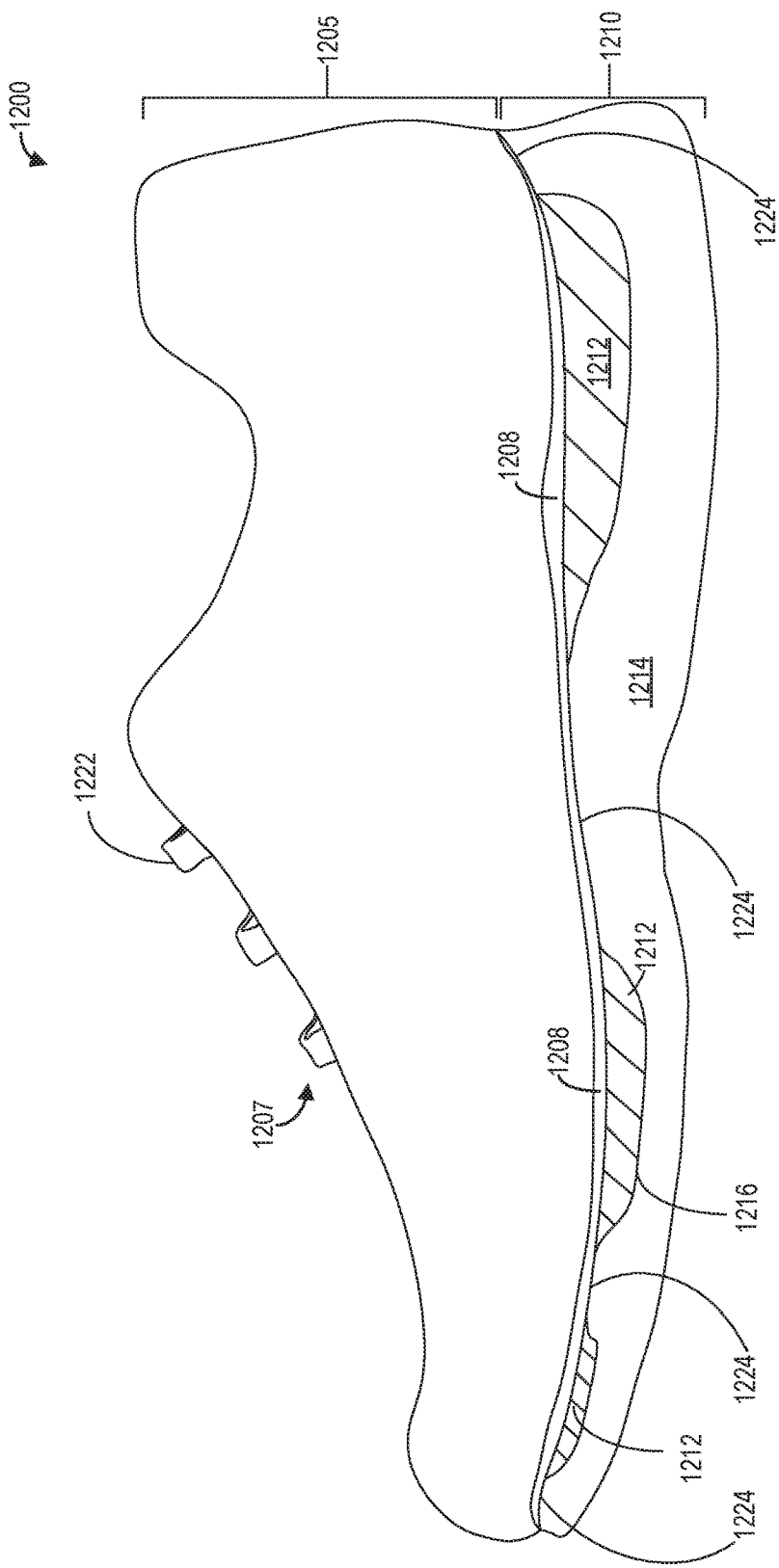
FIG. 12 shows a side cross-section view of a footwear article with a dual-density sole according to at least one example of the disclosure.

Variable-density soles for articles of footwear and methods for constructing said soles are provided herein. FIG. 1 shows an example method for creating a variable- or dual-density sole with a single injection based on a foot pressure map. FIGS. 2-3 illustrates example foot pressure maps. FIG. 4 shows another example method for creating a dual-density sole with a single injection based on a foot pressure map. FIGS. 5-6 pictorially illustrate such a method. FIG. 7 illustrates the relative shapes of the dual sole layers. FIGS. 8-9 illustrate different views of an upper with a first sole layer attached thereto. FIGS. 10A-11 illustrate the dual sole layers separately and in combination. As shown in FIG. 10B, a first layer of the sole may have a base thickness that corresponding to a pressure region on a foot pressure map that is less than a threshold pressure. Additionally, a thickness of one or more regions of the first layer of the sole may be increased relative to a base thickness based on a foot pressure map, and/or the thickness of one or more regions of the first layer of the sole may be decreased relative to the base thickness based on a foot pressure map, such as one of the foot pressure maps shown in FIGS. 2-4. FIG. 12 illustrates a side cross-sectional view of a footwear article with a dual-density sole.

As described herein, a variable-density sole for an article of footwear comprising a first layer comprising a first material of a first density coupled to a bottom surface of an upper of the article of footwear may be shown at FIG. 6, for example. The shape of the first layer may be based on a foot pressure map, such as the foot pressure maps shown in FIGS. 2-3, for example. Further, a second layer comprising a second material of a second density greater than the first density, wherein the second layer is molded to the first layer and includes a cavity corresponding to the shape of the first layer is also shown at FIG. 6, for example, with a cross-sectional view of the assembled first layer and second layer shown at FIG. 12. A thickness of the first layer may correspond to pressure measurements of a foot pressure map, such as shown at FIGS. 2-3, where a higher pressure corresponds to an increased thickness of the first layer.

For example, regions of higher pressure on the foot pressure map, such as the foot pressure maps shown in FIGS. 2-3, may be used to produce the first layer with increased thickness at regions of the first layer corresponding to the regions of higher pressure on the foot pressure map, as shown in FIG. 10B. Similarly, a lower pressure on the foot pressure map upon which the first layer is based may correspond to a decreased thickness of the first layer, as also shown in FIG. 10B. The outline of the first layer may correspond to an outline of a non-negligible pressure region in the foot pressure map, such as shown in FIGS. 2-3, for example. The first layer may include a rearward pad portion for heel support, a middle pad portion for arch support, and a forward pad portion for support of a ball of a foot, the forward pad region including one or more toe pad portions, as shown in FIG. 10B. Sides of the first layer and a bottom surface of the first layer may be covered by the second layer upon coupling the first layer and the second layer, and the first layer may be positioned between the bottom surface of the upper and a top surface of the second layer, as illustrated in FIGS. 5, 6, and 12, for example. Alternatively, in at least one example, a top surface of the first layer may be completely covered by the bottom surface of the upper of the article of footwear, and a bottom surface of the first layer may be completely covered by the top surface of the second layer, where at least a portion of the sides of the first layer are covered by the second layer, as shown in FIGS. 5, 6, and 12, for example.

Furthermore, in some examples, a thickness of the first sole layer may correspond to pressure measurements of a foot pressure map, such as foot pressure maps shown in FIGS. 2-3. As shown in FIG. 10B, a higher pressure on the foot pressure map may correspond to an increased thickness of the first sole layer while a lower pressure may correspond to a decreased thickness of the first sole layer. In at least one example, the thickness of the first layer may be increased relative to a base thickness of the first layer at regions on the foot pressure map that indicate a pressure above a threshold. Further, in at least one example, the thickness of the first layer may be increased relative to the base thickness of the first layer at an arch region of the first layer, even if the arch region is below the threshold pressure, as discussed at FIG. 2.

As described further herein, a dual-density sole may be created using a single injection, wherein a material with a first density is attached to an upper prior to injection and a second material with a second density is injected around or to the first material. In other words, a method of footwear production includes directly attaching a soft, light-weight material to the strobel board/sock or bottom of the upper, which can be applied in a direct-molding process or cement.

The upper with the soft material attached is then placed on the injection machine. The second density material is then injected to the upper, creating a direct bond as well as forming the midsole and/or outsole. At the same time, the second density material is bonded to the first density material and, if needed, encapsulating it.

Further, while a sole comprising layers of two different densities are described herein, it should be appreciated that such a dual-density sole is non-limiting and exemplary, and that the methods and systems described herein may be applied to soles of various densities. For example, a sole constructed in accordance with this disclosure may include multiple layers (e.g., two or more layers), each layer with a different density. As another example, a sole constructed in accordance with this disclosure may include multiple layers (e.g., two or more layers) of variable density. For example, one layer may be of a first density while a second layer may have a variable density throughout the second layer. The appropriate densities and distribution thereof in a sole can be selected and constructed as described further herein.

FIG. 1 shows a high-level flow chart illustrating an example method 100 for creating a variable- or dual-density sole wherein a first sole layer is first molded based on a foot pressure map and then attached to an upper basis unit of a footwear article.

Method 100 begins at 105. At 105, method 100 includes molding a first layer comprising a first material of a first density based on a foot pressure map. Specifically, the first layer may be shaped to correspond to an outline of a footprint area wherein pressure on the foot is above a pressure threshold. Further, the thickness of the first layer may correspond to the particular pressure levels across the footprint area.

As an illustrative example, FIG. 2 illustrates an example foot pressure map 200. The pressure or force per unit area may be measured across a footprint 201 or the bottom of a human foot. This pressure represents the force on the foot of a person when the person is standing, walking, and/or running. For example, a foot pressure map may be generated by averaging multiple measured foot pressure profiles, each foot pressure profile measured by a pressure sensing device. However, in other examples, a foot pressure map may be generated based on a single measured foot pressure profile.

In some examples, the pressure, or force per unit area, measured across the footprint 201 may be measured by tracking pressure forces between the foot of the person and a pressure sensing device when the person is walking, running, etc. It is noted that the pressure sensing device sensitivity may need to be calibrated to enable comparison for foot pressure mapping based on the foot pressure profiles of different people. Additionally or alternatively, the foot pressure mapping may also simply be a comparison of foot pressure regions relative to one another. For example, foot pressure profiles may measure and map regions of the foot that have a greatest amount of pressure, a least amount of pressure, and pressure variation in between may be measured and mapped.

Additionally or alternatively, the pressure measured across the footprint 201 may be measured by tracking pressure forces between the foot of the person and the pressure sensing device when the person is in a standing position and not moving. A foot pressure map may then be generated to display regions of varying pressure on the foot based on data collected from a single foot pressure sensing event or based on an average of foot pressure mapping data collected from multiple foot pressure sensing events, where each foot pressure sensing event generates a foot pressure profile.

Foot pressure map 200 includes multiple pressure regions corresponding to different pressure levels. Pressure region 205 comprises the area of the footprint 201 wherein the pressure is above a first pressure threshold. The first pressure threshold may be determined in order to correspond to a non-negligible pressure. An outline of the non-negligible pressure 204 of the foot pressure map 200 may correspond to an outline of a first layer of a sole produced based on the foot pressure map in at least one example.

Within the pressure region 205, high-pressure regions 215 comprise areas of the footprint 201 wherein the pressure is above a second pressure threshold, the second pressure threshold higher than the first pressure threshold.

Although FIG. 2 illustrates two pressure thresholds in a foot pressure map, it should be appreciated that a plurality of discrete pressure thresholds may be used to create a more detailed foot pressure map. For example, the foot pressure map 200 may include a plurality of pressure regions, such as those depicted by dashed lines 220, which may correspond to increasing pressure levels. Alternatively, the pressure map may include continuous changes in pressure across the pressure region 205 to represent the large plurality of pressure gradations in the foot pressure map 200.

In some examples, the foot pressure map 200 may comprise the pressure map of a single human foot. Alternatively, the foot pressure map 200 may be created based on an average of a plurality of such foot pressure measurements. Further, pressure may be distributed differently across feet of different sizes. Thus, in some examples, a foot pressure map such as the foot pressure map 200 may be created for different foot sizes.

With regard to method 100 of FIG. 1, the first layer may be molded such that the shape of the first layer corresponds to the shape of pressure region 205 (including the high-pressure regions 215). The thickness of the first layer further depends on the particular pressures within the pressure region 205. For example, the first layer may be thicker in high-pressure regions 215, and thinner in the lower-pressure regions of pressure region 205. A more detailed pressure map than the example pressure map depicted in FIG. 2 may be used to create the first layer with smooth transitions between regions of differing pressures.

Further, in some examples, the foot pressure map 200 may be adjusted to add additional cushioning for selected regions of the foot. For example, while the arch area of the foot pressure map 200 may be a lower pressure region when directly measuring foot pressure of a human footstep, it may be desirable to provide more cushioning at the arch region of the foot compared to other regions of the foot to provide arch support. Thus, after pressure mapping the foot, the pressure levels of the foot pressure map 200 may be altered in the arch area to be increased so that the corresponding thickness of the first layer is increased at the arch area. In such examples, when producing a first layer of a sole from such an altered pressure map, a thickness of the first layer of the sole may be increased relative to a base thickness of the first layer of the sole at an arch region of the first layer of the sole, even if the arch region has less than the threshold pressure that was used to increase other regions of the first layer of the sole. Further, the shape of the pressure regions may be selectably adjusted as a part of the process for altering the foot pressure map. In this way, the levels and shapes of the pressure regions in the foot pressure map 200 may be adjusted beyond the pressure of a human foot step as depicted. As a result, the thickness and shape of the first layer may correspond approximately to the pressure and shape of a human footprint, respectively, but may be adjusted based on additional considerations. As non-limiting examples, the shape of the first layer may be smaller or larger than a footprint, and the thickness may optionally be greater in regions of low pressure. For example, and not as a limitation, an example pressure map may include variable cushioning regions and/or stability/pressure points corresponding to a foot portion, such as an arch, a fore-foot portion, a mid-foot portion, a heel portion, etc.

As another illustrative example, FIG. 3 shows another example foot pressure map 300 of a footprint 301. With different pressure thresholds, the shape of the foot pressure map 300 may be different than the foot pressure map 200 described herein above. Foot pressure map 300 includes a pressure region 305 and a higher pressure region 315. Furthermore, the foot pressure map 300 includes a non-negligible pressure outline 304, similar to non-negligible pressure outline 204 of pressure map 200. This non-negligible pressure outline 304 may correspond to an outline of a first layer of a sole that is based on the foot pressure map 300, in at least one example. The first layer of the dual-density sole may be shaped according to foot pressure map 300, as described above with regard to FIG. 2.

Referring again to FIG. 1, the first layer therefore comprises a three-dimensional layer that corresponds to a foot pressure map. In some examples, the first material may comprise a polyurethane-based material, though it should be appreciated that in other examples, a different lightweight material may be used to create the first material.

Further, in some examples, method 100 may further include trimming the first layer to precisely correspond to the foot pressure map (e.g., if excess material is attached to the first layer).

Method 100 proceeds to 110 after molding the first layer. At 110, method 100 includes attaching the first layer to the bottom of an upper basis unit. For example, the first layer may be attached to the bottom of the upper basis unit using, as non-limiting examples, cement or another adhesive. The term upper basis unit, in the context of the present disclosure, refers to at least a portion of an upper of a footwear article to which the dual-density lower will be fixedly attached. In one embodiment, the first layer may first be attached to a strobel board, which may then be stitched to an upper basis unit.

Continuing at 115, method 100 includes positioning the upper basis unit with the first layer on an injection molding machine. At 120, method 100 includes injecting a second material of a second density directly to the upper basis unit with the first layer to form a second sole layer. In at least one example, a bottom surface of the upper basis unit and the second material together encapsulate the first layer between the second layer and the upper basis unit, such that the first layer may not be viewable once the second layer is injected to the upper basis unit with the first layer. In particular, the second material may completely cover a bottom surface of the first material upon direct injecting the second material to the first material.

Further, in addition to covering the bottom surface of the first material upon direct injecting the second material to the first material, in at least one example, at least a portion of the sides of the first material may be covered by the second material. Furthermore, in some examples, the second material may be direct injected to only cover portions of the first material that are most prone to degradation. These portions of the first material that are most prone to degradation after fixing the first material to the upper basis unit may include a bottom surface of the first material, a toe region of the first material, and a heel region of the first material, for example. However, a portion or all of the sides of the first material may be less prone to degradation and thus may still be exposed after applying the second material to the first material.

By only covering a portion of the first material with the second material, an amount of the second material used may be reduced and an overall cost savings may be realized, while still protecting the first material from degradation and achieving the above-discussed benefits of the first material.

After injecting the second material, the upper basis unit with the two layers attached thereto may be removed from the injection molding unit. Method 100 may then end.

Instead of manufacturing the first sole layer independent of the upper basis unit, in some examples the first sole layer may be directly molded onto the upper basis unit. To that end, FIG. 4 shows a high-level flow chart illustrating an example method 400 for creating a dual-density sole wherein a first sole layer is directly molded to at least a portion of an upper of a footwear article.

Method 400 begins at 405. At 405, the method includes directly molding a first material of a first density directly to a strobel board or sock or the bottom of an upper basis unit. The first material may comprise a polyurethane-based material. In some examples, the first material may be molded into a shape based on a foot pressure map. Specifically, as described herein above with regard to FIGS. 2-3, the first layer may be directly molded such that the shape of the first layer corresponds to the shape of pressure region 205 (including the high-pressure regions 215). The thickness of the first layer further depends on the particular pressures within the pressure region 205. For example, the first layer may be thicker in high-pressure regions 215, and thinner in the lower-pressure regions of pressure region 205. A more detailed pressure map than the example pressure map depicted in FIG. 2 or FIG. 3 may be used to create the first layer with smooth transitions between regions of differing pressures.

Attaching the first material to the strobel board or bottom of the upper may comprise directly molding the first material to the strobel board. The first material attached to the strobel board thus comprises a first sole layer with a first density. By directly molding the first layer to the strobel board or the bottom of the upper basis unit, the number of steps in creating a dual-density sole may be reduced.

In some embodiments, the strobel board with the first material molded thereon may be stitched to an upper.

At 410, method 400 includes positioning the strobel board or sock with the first material attached thereto onto an injection machine. In some embodiments, the upper with the strobel board stitched thereto, and first material molded to the strobel board, may be positioned on the injection machine.

At 415, method 400 includes injecting, with the injection machine, a second material directly to the strobel board or sock with the first material. The second material is thus directly bonded to the strobel board or sock as well as the first material, and the second material may encapsulate a remaining portion of the first material that is still exposed.

Directly molding the first material to the strobel board or bottom of the upper and directly molding the second material to the first material may be advantageous over traditional cemented footwear. This is not least because directly molding the first material and the second material via the above discussed approach may reduce a production time, cost, and amount of manufacturing space required to form a sole with multiple layers of differing densities. For example, cemented footwear may require more manufacturing space and time in order to accommodate a production line that produces multiple separate molds, cements these molds to the strobel board or bottom of the upper, and cures one or both of the molds and the cement.

The second material may comprise a polyurethane-based material with a second density greater than the first density. Thus the first material and the second material in combination comprise a dual-density sole.

By encapsulating the first material with the second material, a softer or more comfortable underfoot feel may be achieved for a person wearing the resulting article of footwear, while still providing protection and structure needed for durability of the article of footwear. Method 400 may then end.

The method described above provides for a sole comprising lightweight, low-density polyurethane compounds that in prior methods may not have been used due to weak physical properties. Specifically, by injecting other higher-density polyurethane compounds around the low-density polyurethane, a softer or more comfortable underfoot feel may be achieved, while still providing protection and structure needed for durability of the shoe. Further, the overall density of a sole may be reduced which may result in a reduction of overall weight of the article of footwear.

In one embodiment of the method, the first layer also referred to herein as the inner compound, may be molded directly onto a strobel board of a shoe or another exterior bottom surface of a shoe upper. In this way, the cushion provided by the low-density inner compound may not be limited by adhesive layers or layers of other bonding agents. The direct molding of the first layer onto the strobel board of a shoe may improve overall cushioning and flexibility of the shoe.

Further, molding the first layer directly to the strobel board simplifies the production process. Specifically, by molding the first layer to the strobel board and stitching the strobel board to the upper, and then positioning the upper (with the strobel board and first layer) onto an injection machine, the injection of the second layer is simplified because the upper with the first layer acts partially as a mold for the second layer.

FIG. 5 illustrates an example method 500 for providing a dual-density sole to an upper. Specifically, as described with regard to the method 100 of FIG. 1, a first sole layer 515 with a shape and thickness based on a foot pressure map is attached 510 to the bottom of an upper basis unit 505. Additionally, in at least one example an outline of the first layer 504 corresponds to an outline of a non-negligible pressure region in the foot pressure map, such as the outline 204 or outline 304, for example. The first sole layer 515 may have a top surface that mates with the bottom surface of the upper basis unit 515. A bottom surface of the first sole layer 515 that is opposite the top surface of the first sole layer may be varied in shape. In at least one example, the top surface of the first sole layer 515 in contact with the bottom surface of the upper basis unit 505 may be substantially flat.

In at least one example, the first sole layer 515 may be directly molded to the bottom of the upper basis unit 505 in an adhesiveless manner. Examples where the first sole layer 515 may be directly molded to the bottom of the upper basis unit 505 may be enable the first sole layer 515 to be more flexible compared to approaches where the layers of the sole may be cemented to the bottom of the upper basis unit. This is not least because in examples where the layers of the sole are cemented to the upper basis unit the flexibility of the layers of the sole may be limited to the flexibility of the cement. The second sole layer 525 is then directly injected 520 to the upper basis unit 505 and the first sole layer 515. Direct injection of the second sole layer 525 to the upper basis unit 505 and the first sole layer 515 following direct injection of the first sole layer 515 to the upper basis unit 505 may result in the formation of a cavity 526 that corresponds to the shape of the first sole layer 515.

Additionally, in at least one embodiment, direct injection of the second sole layer 525 to the upper basis unit 505 and the first sole layer 515 may result in the formation of second sole side walls 528. These second sole layer side walls 528 may cover sides of the first sole layer 515 in at least one example. For example, the second sole layer side walls 528 may completely cover and contact the sides of the first sole layer 515. Such examples may be beneficial for preventing degradation of the first sole layer 515, as the first sole layer 515 may be less dense that the second sole layer 525, and the second sole layer 525 may be more durable and protect the first sole layer 515. In at least one example, the second sole layer side walls 528 may only partially cover the sides of the first sole layer 515. For example, the second sole layer side walls 528 may only cover sides of the first sole layer 515 particularly susceptible to degradation. For example, the second sole layer side walls 528 may only cover the sides of the first sole layer 515 at a heel end and at a toe end of the first sole layer 515. Such examples may be beneficial for decreasing a cost to produce a footwear article by reducing an amount of material used to form the second sole layer 525 while still protecting regions of the first sole layer 515 from degradation.

As depicted, the first sole layer 515 may be shaped to resemble a sole of a human foot, and may be positioned on the bottom of the upper basis unit 505 to correspond to align with the position of a human foot placed within the upper basis unit 505.

More specifically, the shape of the first sole layer 515 may correspond to the portions of a human foot's sole through which the most force is provided to the foot during activities such as walking. To that end, the shape of the first sole layer 515 may exclude at least a portion of the medial region of the foot's sole, which is typically arched slightly upwards and thus transmits less force while walking. In this way, the lower density of the first sole layer 515 may provide increased comfort to the foot in contrast with a single sole layer with a higher density, such as the second sole layer 525. For illustrative purposes, the first sole layer 515 is shaded to indicate that the first sole layer 515 and the second sole layer 525 have different densities. However, in at least one example, the arch region of the first sole layer 515 may be thicker than a remainder of the first sole layer 515 to provide additional cushioning and support to the arch.

In contrast with the first sole layer 515, the second sole layer 525 may be shaped to completely cover the bottom surface of the upper basis unit 505 and the bottom surface of the first sole layer 515. In at least one example, the second sole layer 525 may be injected over the first sole layer 515, after the first sole layer 515 has been directly molded to the upper basis unit 505. Thus, the second sole layer 525 may completely cover and continuously contact an entire bottom surface of the first sole layer 515 that is exposed after the first sole layer 515 is coupled to the upper basis unit 505. Additionally, in at least one example, the second sole layer 525 may further cover at least at portion of the sides of the first sole layer 515. In some examples, the second sole layer 525 may completely cover all exterior surfaces of the first layer 515 exposed after attaching the first sole layer 515 to the bottom surface of the upper basis unit 505. For example, the second sole layer 525 may contact and completely cover a bottom surface of the first sole layer 515 and the sides of the first sole layer. Given the greater density of the second sole layer 525 in comparison to the density of the first sole layer 515, the first sole layer 515 and the bottom of the upper 505 may be protected from external elements by the second sole layer 525.

Further, by injecting the second material onto the upper basis unit 505 with the first sole layer 515, wherein the first sole layer 515 includes varying thicknesses based on the foot pressure map, the second sole layer conforms to the shape of the first sole layer 515 and is thus at least partially formed or molded by the first sole layer 515.

FIG. 6 illustrates an example method 600 for providing a dual-density sole to an upper. Specifically, the second sole layer 615 is directly injected 610 to the bottom surface 612 of the upper 605 and the first sole layer 607. An entire top surface of the first sole layer 607 is covered and in contact with the bottom surface 612 of the upper 605.

As depicted, the first sole layer 607 only partially covers the bottom of the upper 605 in order to provide increased comfort to a human foot placed within the upper 605, while the second sole layer 615 fully covers a bottom surface and sides of the first sole layer 607 and covers the entire remaining exposed portion of the bottom surface 612 of the upper 605.

FIG. 7 shows an exploded view of a dual-density sole 700 in accordance with the present disclosure. The dual-density sole 700 includes a first sole layer 705 of a first density and a second sole layer 710 of a second density.

As described above, the first sole layer 705 is shaped based on a foot pressure map in order to provide comfort to the portions of a human foot through which the most force is transmitted during activities such as walking or running, while the shape of the second sole layer 710 is larger than the shape of the first sole layer 705 in order to provide full support and protection of the first sole layer 705 from external elements that may degrade the first sole layer 705.

FIG. 8 shows a side view of an example article of footwear 800 including a first sole layer 810 attached to an upper 805. A top surface of the first sole layer 810 is attached to the upper 805, while the sides 818 of the upper are exposed. It is noted that, although not shown in FIG. 8, following attachment of the first sole layer 810 to the upper 805 a second sole layer may directly injected onto the first sole layer 810, and the second sole layer may completely cover a bottom surface of the first sole layer 810 and at least partially cover the sides 818 of the first sole layer 810. In some examples, the second sole layer may completely cover the bottom surface of the first sole layer 810, and the second sole layer may completely cover the sides 818 of the first sole layer 810. For example, side walls of the second sole layer, such as side walls 525 shown in FIG. 5, may at least partially cover the sides 818 of the first sole layer 810. It is noted that the sides 818 of the first sole layer refer to the exterior of the first sole layer 810 that is between the top surface and the bottom surface of the first sole layer 810. A lacing system comprising a plurality of straps 816 may be coupled to the upper. Though more than one straps 816 may be included in the lacing system shown in FIG. 8, it is noted that in other examples only one strap may be included in the lacing system. More details regarding the lacing system may be discussed in relation to FIG. 9.

Turning now to FIG. 9, FIG. 9 shows a bottom-side perspective view of an article of footwear 900 including a first sole layer 810 attached to an upper 805. As depicted, a lacing system including a plurality of straps 816 which wrap around an arch region of the upper 805 may be attached to the upper 805 prior to directly molding or attaching the first sole layer 810 to the upper 805. In this way, the lacing system is further coupled to the upper 805, as the laces of the lacing system are positioned between the first sole layer 810 and the upper 805. Additionally, the particular positioning of the laces of the lacing system to wrap around the arch region of the upper 805, from a top surface of the upper 805 to a bottom surface of the upper 805, may be beneficial for providing additional arch support.

FIG. 10A shows a top view of different components of a dual-density sole 1000. Specifically, the dual-density sole 1000 includes a first sole layer 1010 of a first density and a second sole layer 1005 of a second density. The second sole layer 1005 includes an imprint or mounting groove 1007 corresponding to the shape of the first sole layer 1010. The imprint 1007 is formed as a negative space corresponding to the shape of the first sole layer 1010 because the second sole layer 1005 is molded to the first sole layer 1010, as described above. The first sole layer 1005 includes a rearward pad portion 1032 for heel support, a middle pad portion 1034 for arch support, and a forward pad portion 1036 for support of a ball of a foot, wherein the forward pad portion includes one or more toe pad portions 1028.

FIG. 10B shows a cross-sectional side view 1014 of a first sole layer. In at least one example, FIG. 10B shows a cross-sectional side view 1014 taken along axis 1012 of the first sole layer 1010 shown in FIG. 10A. As shown in FIG. 10B, a thickness of the first sole layer is varied relative to a base thickness of the first sole layer. In at least one example, the base thickness of the first sole layer may be a thickness with which the first sole layer is produced based on a foot pressure map indicating less than a threshold amount of pressure. For example, the base thickness of the first sole layer may be the thickness of the sole layer corresponding to regions of a foot pressure map that indicate that there was contact between the foot and the foot pressure sensor but that was less than a threshold pressure. In FIG. 10B, for example, the base thickness may be thickness 1024 of the first sole layer.

In FIG. 10B, the first sole layer has a base thickness 1024 at a location between a toe of and the ball of the foot of the first sole layer. However, it is noted that the first sole layer may have a base thickness 1024 at any one or combination of the regions of the first sole layer. The first sole layer may have a base thickness 1024 at regions indicated by a foot pressure map to have less than a threshold pressure, in at least one example. Furthermore, the base thickness 1024 may be varied. For example, in some examples the base thickness 1024 may be thicker, and in other examples the base thickness 1024 may be thinner than the base thickness 1024 that is shown in FIG. 10B.

The thickness of the first sole layer may be increased relative to a base thickness 1024 at one or more regions based on a foot pressure map. Additionally or alternatively, a thickness of the first sole layer may be decreased relative to a base thickness at one or more regions of the first sole layer based on a foot pressure map. Furthermore, one or more regions of the first sole layer may be a same thickness as the base thickness based on a foot pressure map.

As discussed above, regions of increased thickness of the first sole layer may correspond to regions of increased pressure on a foot pressure map. Additionally, regions of decreased thickness of the first sole layer may correspond to regions of pressure on a foot pressure map less than a threshold pressure. For example, one or more of a heel thickness 1018, an arch thickness 1020, a ball of the foot thickness 1022, and a toe thickness 1026 of the first sole layer may be increased relative to a base thickness 1024 based on a pressure map indicating that one or more of these regions exceeds a threshold pressure, while regions of the first sole layer with a base thickness 1024 may correspond to regions on the foot pressure map that are less the threshold pressure, and where regions of the first sole layer that are less than the base thickness 1024 may correspond to regions on the foot pressure map that are less than a second threshold pressure, the second threshold pressure less than the threshold pressure discussed above (i.e., the first threshold pressure). Thus, the first sole layer may efficiently provide more cushioning where it is needed.

Furthermore, in at least one example, the foot pressure map may be altered to increase or decrease a thickness of the first sole layer. For example, the solid lines indicating the arch thickness 1020 indicate a thickness which the first sole layer would be produced absent alterations to the foot pressure map. However, in at least one example, the foot pressure map may be altered to increase or decrease a thickness in the corresponding first sole layer. Examples of potential increases and decreases to a first sole layer due to an altered foot pressure map are shown in dash line at FIG. 10B, where the first sole layer may be varied in thickness (i.e., increased or decreased in thickness) between any of the lines 1038, 1040, 1042, 1044, 1046, and 1048, for example. It is noted that the options for thickness variation of the first sole layer shown in dash are for illustrative purposes and that other options for varying the thickness may also be possible.

To decrease a thickness of the first sole layer at a region, a corresponding region of the foot pressure map upon which the first sole layer is based may be altered to decrease the pressure indicated on the foot pressure map. Furthermore, to increase a thickness of the first sole layer at a region, a corresponding region of the foot pressure map upon which the first sole layer is based may be altered to increase the pressure indicated on the foot pressure map. Put another way, in at least one example, increasing an amount of pressure indicated on the foot pressure map may increase a corresponding thickness of the first sole layer while decreasing an amount of pressure indicated on the foot pressure map may decrease a corresponding thickness of the first sole layer.

It is noted that while the increased and decreased thickness options are shown at the arch of the first sole layer, any one or combination of regions of the foot pressure map may be altered to increase or decrease a corresponding region of the first sole layer.

FIG. 11 shows a top view of a dual-density sole 1100 including a first sole layer 1110 attached to a second sole layer 1105. The position of the first sole layer 1110 corresponds to the imprint or mounting groove 1007 of the second sole layer 1105.

In combination, the first sole layer and the second sole layer described herein above may comprise a dual-density sole. In some examples, this dual-density sole may comprise a midsole. In such examples, an outsole may be fixed to the bottom of the second sole layer to provide additional protection and durability of an article of footwear. In other examples, the second sole layer may comprise the outsole.

FIG. 12 shows a side cross-sectional view of a footwear article 1200 with a dual-density sole 1210. An upper 1205 including a lacing system 1207 comprising a plurality of straps 1222 includes a strobel board or sock 1208 fixed to the bottom of the upper 1205.

The first layer 1212 with a first density is attached to the strobel board 1208, and has varying thickness throughout the first layer 1212 based on a foot pressure map as described above. Coupling the first layer 1212 to the strobel board 1208 may include completely covering a top surface of the first layer 1212. In at least one example, the top surface of the first layer 1212 may be completely and contiguously contact a bottom surface of the strobel board 1208.

While the top surface of the first layer 1212 is completely covered by the bottom surface of the strobel board 1208, however, not all of the bottom surface of the strobel board 1208 is covered by the first layer 1212. Rather, the second layer 1214 is coupled to the strobel board 1208 and/or the upper 1205 as well as the first layer 1212.

As such, all of the top surface of the first layer 1212 may be covered and/or in contact with a bottom surface of the strobel board 1208, and all of the bottom surface of the first layer 1212 may be covered and/or in contact with a top surface of the second layer 1214. Additionally, one or more regions of a top surface of the second layer 1214 are directly coupled to the strobel board 1208, as shown at regions 1224 of the second layer. Thus, the strobel board 1208 is coupled to both the first layer 1212 and the second layer 1214.

In at least one example, the second layer 1214 and the upper 1205 together may encapsulate (i.e., completely surround and cover) the first layer 1212. For example, the second layer 1214 may completely cover exterior surfaces of the first layer 1212 that are exposed after coupling the first layer 1212 to the bottom strobel board 1208, where the strobel board 1208 completely covers a top surface of the first layer 1212. In at least one example, completely covering the first layer 1212 with the second layer 1214 may include the second layer 1214 covering a bottom surface 1216 of the first layer 1212 as well as completely covering remaining side surfaces of the first layer 1212 that are exposed after coupling the first layer 1212 to the strobel board. As described above, the material comprising the second layer 1214 has a higher density than the material comprising the first layer 1212.

Several advantages may be achieved by having the first layer 1212 with the first density attached to the strobel board 1208 and the second layer 1214 completely covering a bottom surface and side surfaces of the first layer 1212, and the second layer 1214 having a higher density than the first density.

For example, as the first layer 1212 is encapsulated by the second layer 1214 that has a higher density and the bottom surface of the strobel 1208, the first layer 1212 may comprise a material that is light and comfortable for underfoot feel but that may be too weak to serve as the outsole of the shoe. In particular, the second layer 1214 may comprise a material that is sufficiently durable to provide structure and stability for the outsole and to protect the less dense first layer 1214 from degradation. Furthermore, an overall weight of the footwear article may be reduced while still achieving a durable outsole due to the combination of the first layer 1212 comprising a material with a first density being covered by the second layer 1214 comprising a material with a second density that is greater than the first density.

Various embodiments of dual-density soles, articles of footwear including said dual-density soles, and methods for producing said soles are provided. In one embodiment, a dual-density sole for an article of footwear comprises: a first layer comprising a first material of a first density adhesively coupled to a bottom surface of an upper of the article of footwear, wherein a shape of the first layer is based on a foot pressure map; and a second layer comprising a second material of a second density greater than the first density, wherein the second layer is molded to the first layer and includes a cavity corresponding to the shape of the first layer.

In a first example of the dual-density sole, a thickness of the first layer corresponds to pressure measurements of the foot pressure map, wherein a higher pressure corresponds to an increased thickness of the first layer while a lower pressure corresponds to a decreased thickness of the first layer, where the increased thickness and decreased thickness are increased and decreased thicknesses relative to a base thickness of the first layer.

In a second example of the dual-density sole optionally including the first example, an outline of the first layer corresponds to an outline of a non-negligible pressure region in the foot pressure map.

In a third example of the dual-density sole optionally including one or more of the first and second examples, the first layer includes a rearward pad portion for heel support, a middle pad portion for arch support, and a forward pad portion for support of a ball of a foot, wherein the forward pad portion includes one or more toe pad portions.

In a fourth example of the dual-density sole optionally including one or more of the first through third examples, the first layer is disposed within an interior region of the second layer.

In a fifth example of the dual-density sole optionally including one or more of the first through fourth examples, the first layer is positioned between the bottom surface of the upper and the second layer.

In a sixth example of the dual-density sole optionally including one or more of the first through fifth examples, a top surface of the first layer is completely covered by the bottom surface of the upper of the article of footwear, and a bottom surface of the first layer is completely covered by the top surface of the second layer. In some examples, the first layer is fully encapsulated by the second layer and the bottom surface of the knit upper. In at least one example, the second layer is formed around the first layer via direct injection.

In a seventh example of the dual-density sole optionally including one or more of the first through sixth examples, the first material and the second material comprise polyurethane-based materials.

In another embodiment, a method of manufacturing a dual-density sole comprises: constructing a first sole layer comprising a first material having a first density based on a foot pressure map; coupling the first sole layer directly to a bottom exterior surface of an upper; and encapsulating the first sole layer with a second sole layer via injection molding the second sole layer onto and around the first sole layer, wherein the second sole layer comprises second material having a second density greater than the first density of the first material.

In a first example of the method, the first sole layer is coupled to the bottom exterior surface with an adhesive. In a second example of the method optionally including the first example, constructing the first sole layer and coupling the first sole layer to the bottom exterior surface comprises directly molding the first sole layer to the bottom exterior surface. In a third example of the method optionally including one or more of the first and second examples, a thickness of the first sole layer corresponds to pressure measurements of the foot pressure map, wherein a higher pressure corresponds to an increased thickness of the first sole layer while a lower pressure corresponds to a decreased thickness of the first sole layer, the increased thickness being a thickness increased relative to the base thickness of the first sole layer and the decreased thickness being a thickness that is the same or less than the base thickness of the first sole layer. In a fourth example of the method optionally including one or more of the first through third examples, the foot pressure map comprises an average of a plurality of foot pressure measurements. One or both of the first material and the second material may be polyurethane-based materials, for example.

In yet another embodiment, an article of footwear comprises: an upper; a first sole layer comprising a first material of a first density adhesively coupled to a bottom surface of the upper, wherein a shape of the first layer is based on a foot pressure map; and a second sole layer comprising a second material of a second density greater than the first density, wherein the second layer is molded to the first layer and includes a cavity corresponding to the shape of the first layer.

In a first example of the article of footwear, a thickness of the first sole layer corresponds to pressure measurements of the foot pressure map, wherein a higher pressure corresponds to an increased thickness of the first sole layer while a lower pressure corresponds to a decreased thickness of the first sole layer, the increased thickness and the decreased thickness being thicknesses relative to a base thickness of the first sole layer.

In a second example of the article of footwear optionally including the first example, the first sole layer is positioned within the cavity of the second sole layer such that the second sole layer completely covers and is in contact with a bottom surface and all side surfaces of the first sole layer.

In an alternative embodiment, a dual-density sole for an article of footwear comprises: a first layer comprising a first density adhesively coupled to a bottom surface of an upper of the article of footwear; and a second layer comprising a second density greater than the density of the first layer; wherein the first layer is physically coupled to the second layer forming an interface between the layers.

In a first example of the dual-density sole, the first layer is disposed within an interior region of the second layer. In a second example of the dual-density sole optionally including the first example, the first layer is positioned between the bottom surface of the upper and the second layer. In a third example of the dual-density sole optionally including one or more of the first and second examples, the first layer is fully encapsulated by the second layer and the bottom surface of the upper. In a fourth example of the dual-density sole optionally including one or more of the first through third examples, the first layer is shaped substantially similar to a human footstep.

In a fifth example of the dual-density sole optionally including one or more of the first through fourth examples, the second layer further comprises a mounting groove. In a sixth example of the dual-density sole optionally including one or more of the first through fifth examples, the mounting groove matches the shape of the first layer.

In a seventh example of the dual-density sole optionally including one or more of the first through sixth examples, the first layer includes a rearward pad portion for heel support, a middle pad portion for arch support, and a forward pad portion for support of a ball of a foot, wherein the forward pad portion includes one or more toe pad portions.

In an eighth example of the dual-density sole optionally including one or more of the first through seventh examples, the first layer is shaped based on a foot pressure map.

In a ninth example of the dual-density sole optionally including one or more of the first through eighth examples, a thickness of the first layer corresponds to pressure measurements of the foot pressure map, wherein a higher pressure corresponds to an increased thickness of the first layer while a lower pressure corresponds to a decreased thickness of the first layer relative to a base thickness of the first layer.

In a tenth example of the dual-density sole optionally including one or more of the first through ninth examples, an outline of the first layer corresponds to an outline of a non-negligible pressure region in the foot pressure map.

In another alternative embodiment, a method of manufacturing a dual-density sole comprises: constructing a first sole layer comprising a first density; coupling the first sole layer directly onto a strobel board or a bottom exterior surface of an upper; and encapsulating the first sole layer with a second sole layer via injection molding the second sole layer onto and around the first sole layer, wherein the second sole layer comprises a second density greater than the density of the first sole layer.

In a first example of the method, the first sole layer is coupled to the bottom exterior surface of the upper with an adhesive. However, in other examples, the first sole layer may be coupled to the bottom exterior surface of the upper in an adhesiveless manner. For example, the first sole layer may be coupled to the bottom exterior surface via directly injecting the first sole layer to the bottom exterior surface. In a second example of the method, constructing the first sole layer and coupling the first sole layer to the bottom exterior surface comprises directly molding the first sole layer at the bottom exterior surface.

In at least one example of the method, which optionally includes the features of the first and second example methods, basing the shape of the first layer based on the foot pressure map includes varying a thickness of the first layer based on the foot pressure map.

In some examples, such as shown in FIGS. 10A-10B, a thickness of the first layer may be increased relative to a base thickness of the first layer at regions on the foot pressure map that indicate a pressure above a threshold pressure, such as the foot pressure maps shown at FIGS. 2-3. For example, a base thickness, such as the base thickness 1024 shown in FIG. 10B may correspond with regions less than a pressure threshold, such as region 305 of pressure map 300 shown in FIG. 3 or region 205 of pressure map 200 shown FIG. 2, for example. Additionally or alternatively, a thickness of the first layer may be increased at specific regions of the first layer relative to the base thickness of the first layer, even if the specific regions are not above the threshold pressure on the pressure map. For example, one or more regions of pressure maps, such as pressure maps 200 or 300, may be altered to increase a thickness of a corresponding first layer relative to the base thickness of the first layer, resulting in the first layer having an increased thickness relative to the base layer, even if the region that is increased in thickness relative to the base layer is less than a threshold pressure. These specific regions that may be selected for thickening of the first layer may be beneficial for providing additional support and cushioning for specific parts of a foot for a person wearing the footwear article. For example, in at least one example, a thickness of the first layer may be increased relative to the base thickness of the first layer at an arch region of the first layer, even if the arch region is not above the threshold pressure on the pressure map. Such an increasing of the thickness of the first layer at the arch region may be beneficial for providing additional arch support, even though the arch region may not correspond to a region of pressure that is above the threshold pressure on the foot pressure map.

It will be appreciated that the configurations disclosed herein are exemplary in nature, and that these specific embodiments are not to be considered in a limiting sense, because numerous variations are possible. For example, the above technology can be applied to various types of footwear, such as boots and dress shoes. In another example, the technology can be applied to men's, women's, and children's footwear. Further, the technology can be applied to water-submersible shoes. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A variable-density sole, comprising:
   a first sole layer comprising a first material of a first density, wherein the first sole layer is continuous and includes a heel, a midfoot, and a plurality of toe pad portions; and
   a second sole layer comprising a second material of a second density greater than the first density, wherein the second sole layer extends between each of the plurality of toe pad portions, and wherein the second sole layer is molded to the first sole layer and includes a cavity corresponding to a shape of the first sole layer.

2. The variable-density sole of claim 1, wherein the first sole layer is variable in thickness.

3. The variable-density sole of claim 1, wherein a forward pad portion of the first sole layer includes the plurality of toe pad portions.

4. The variable-density sole of claim 1, wherein sides of the first sole layer and a bottom surface of the first sole layer are covered by the second sole layer.

5. The variable-density sole of claim 1, wherein the first sole layer is in contact with a top surface of the second sole layer.

6. The variable-density sole of claim 5, wherein a bottom surface of the first sole layer is completely covered by the top surface of the second sole layer.

7. The variable-density sole of claim 6, wherein at least a portion of sides of the first sole layer are covered by the second sole layer.

8. An article of footwear, comprising:
   an upper;
   a first sole layer comprising a first material of a first density coupled to and contacting a bottom surface of the upper, the first sole layer comprising a material that provides cushioning, wherein the first sole layer includes a heel, a midfoot, and a plurality of toe pad portions, and wherein the plurality of toe pad portions are shaped differently from one another; and
   a second sole layer comprising a second material of a second density greater than the first density, wherein the second sole layer is directly coupled to the bottom surface of the upper, and wherein the second sole layer is molded to the first sole layer and includes a cavity corresponding to a shape of the first sole layer.

9. The article of footwear of claim 8, wherein the first sole layer is variable in thickness.

10. The article of footwear of claim 8, wherein the first sole layer is positioned within the cavity of the second sole layer such that the second sole layer and the bottom surface of the upper encapsulate the first sole layer.

11. The article of footwear of claim 9, wherein the thickness of the first sole layer is increased relative to a base thickness of the first sole layer at an arch region of the first sole layer.

12. An article of footwear, comprising:
    an upper;
    a first sole layer coupled to a bottom surface of the upper, wherein the first sole layer comprises a first material that provides cushioning, wherein the first sole layer includes a heel portion, a midfoot portion, and toe pad portions, wherein the first sole layer covers a portion of the bottom surface of the upper, and wherein the first sole layer varies in thickness; and
    a second sole layer also coupled to the bottom surface of the upper, the second sole layer made of a second material that is more dense than the first material, wherein the second sole layer extends between each of the toe pad portions and fully covers a bottom surface of the first sole layer and a remaining portion of the bottom surface of the upper.

13. The article of footwear of claim 12, wherein a shape of the first sole layer excludes a portion of a medial region of a foot's sole.

14. The article of footwear of claim 12, wherein the first sole layer is directly coupled to the bottom surface of the upper.

15. The article of footwear of claim 12, wherein the bottom surface of the upper and the second sole layer together encapsulate the first sole layer.

* * * * *